(12) United States Patent
Hendry et al.

(10) Patent No.: US 7,413,211 B2
(45) Date of Patent: Aug. 19, 2008

(54) DEACTIVATION ARRANGEMENT FOR A VEHICLE PARK ASSIST SYSTEM

(75) Inventors: Jeffrey C Hendry, Waterford, MI (US); Michael Mashkevich, West Bloomfield, MI (US); Saviana Vasu-Demetriade, Canton, MI (US)

(73) Assignee: Chrysler LLC, Aubrun Hills, MI (US)

( * ) Notice: Subject to any disclaimer, the term of this patent is extended or adjusted under 35 U.S.C. 154(b) by 546 days.

(21) Appl. No.: 11/255,392

(22) Filed: Oct. 21, 2005

(65) Prior Publication Data

US 2007/0096944 A1    May 3, 2007

(51) Int. Cl.
  *B60D 1/00* (2006.01)
  *B60Q 1/48* (2006.01)
(52) U.S. Cl. ............... 280/491.2; 280/511; 340/431
(58) Field of Classification Search .......... 280/477, 280/491.2, 491.5, 504, 511, 761; 340/425.5, 340/431, 932.2
See application file for complete search history.

(56) References Cited

U.S. PATENT DOCUMENTS

| | | | | |
|---|---|---|---|---|
| 4,271,401 A | * | 6/1981 | Meo | 340/431 |
| 5,246,243 A | * | 9/1993 | Carr | 280/428 |
| 5,477,207 A | * | 12/1995 | Frame et al. | 340/431 |
| 6,587,041 B1 | * | 7/2003 | Brown, Jr. | 340/431 |
| 6,788,190 B2 | * | 9/2004 | Bishop | 340/435 |
| 6,980,096 B1 | * | 12/2005 | Washington et al. | 340/431 |
| 7,301,479 B2 | * | 11/2007 | Regan | 340/932.2 |
| 2005/0068197 A1 | | 3/2005 | Regan | |
| 2006/0214392 A1 | * | 9/2006 | Staggs | 280/507 |

* cited by examiner

*Primary Examiner*—Lesley D. Morris
*Assistant Examiner*—Marc A Scharich
(74) *Attorney, Agent, or Firm*—Thomas A. Jurecko

(57) ABSTRACT

A deactivation arrangement for a vehicle park assist system is provided. The deactivation arrangement includes a trailer hitch receiver affixed to the vehicle and arranged to receive a trailer hitch. A switch assembly is provided that is associated with the vehicle park assist system and includes a switch arranged to engage the trailer hitch when the trailer hitch is inserted into the trailer hitch receiver. The switch assembly is arranged to deactivate the vehicle park assist system when the trailer hitch is inserted into the trailer hitch receiver and engages the switch.

12 Claims, 1 Drawing Sheet

DEACTIVATION ARRANGEMENT FOR A VEHICLE PARK ASSIST SYSTEM

FIELD OF INVENTION

The present invention relates generally to a park assist system for a vehicle and, more particularly, to a deactivation arrangement for a vehicle park assist system.

BACKGROUND OF INVENTION

Motor vehicles today are sometimes equipped with devices to assist vehicle operators with parking the vehicle. These devices are commonly used to alert vehicle operators of an imminent collision, such as when the vehicle is operating in reverse. One potential disadvantage of these devices is that use of a trailer may interfere with the device and cause an incorrect indication of an imminent collision to be provided. This can occur, for example, when the vehicle is operated with a trailer or when the vehicle is operated in reverse moving towards a trailer in an effort to attach the trailer to the vehicle. In an attempt to overcome this disadvantage, strategies for disengaging the park assist device have been developed such as where the device is deactivated when a trailer and an accompanying trailer wiring harness are both attached to the vehicle. However, such strategies do not deactivate the park assist device unless the trailer and harness are attached to the vehicle, and thus do not contemplate situations such as when a vehicle operator is reversing the vehicle towards the trailer to attach the trailer to the vehicle.

Thus, there is a need for a deactivation arrangement for a vehicle park assist system that overcomes the aforementioned and other disadvantages.

SUMMARY OF INVENTION

Accordingly, a deactivation arrangement for a vehicle park assist system is provided. The deactivation arrangement includes a trailer hitch receiver affixed to the vehicle and arranged to receive a trailer hitch. A switch assembly is provided that is associated with the vehicle park assist system and includes a switch arranged to engage the trailer hitch when the trailer hitch is inserted into the trailer hitch receiver. The switch assembly is arranged to deactivate the vehicle park assist system when the trailer hitch is inserted into the trailer hitch receiver and engages the switch.

BRIEF DESCRIPTION OF DRAWINGS

Other aspects, features, and advantages of the present invention will become more fully apparent from the following detailed description of the preferred embodiment, the appended claims, and in the accompanying drawings in which:

DETAILED DESCRIPTION OF EXEMPLARY EMBODIMENT(s)

Figure 1:
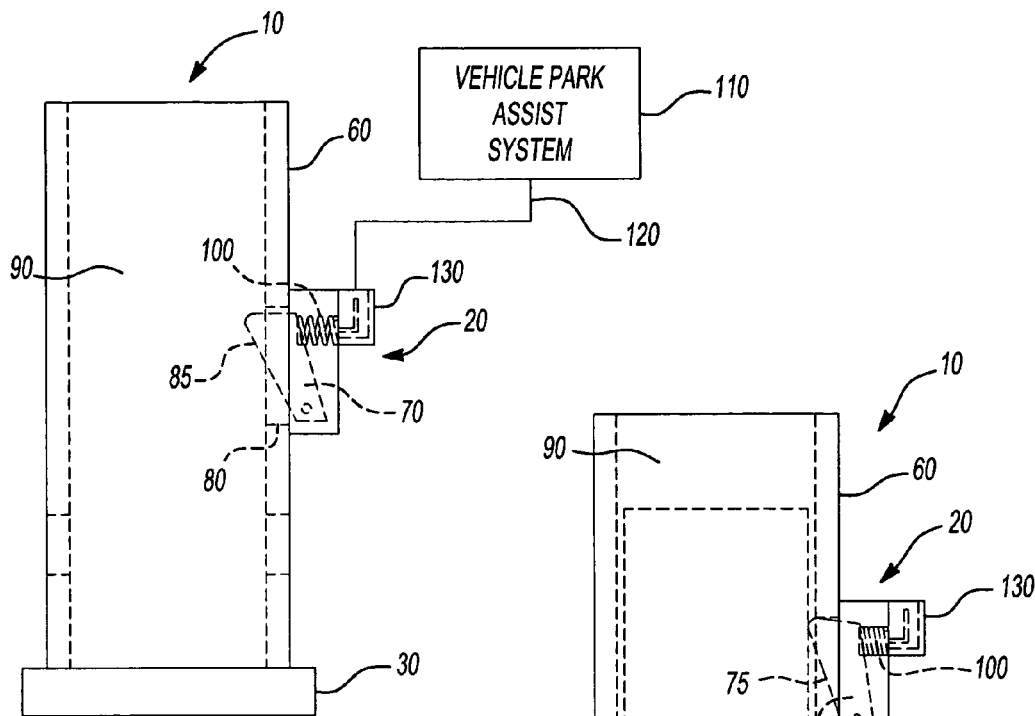
FIG. 1 illustrates a top view of trailer hitch receiver and a switch assembly of a deactivation arrangement for a vehicle park assist in accordance with the present invention.
Figure 3:
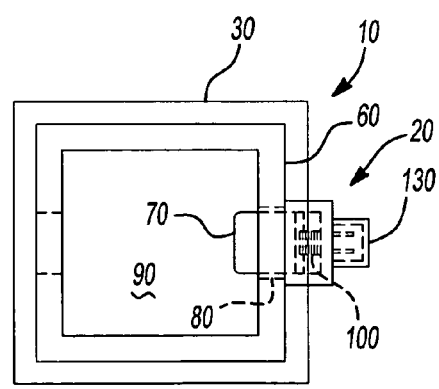
FIG. 3 illustrates a front view of the deactivation arrangement of FIG. 1 in accordance with the present invention.
Figure 2:
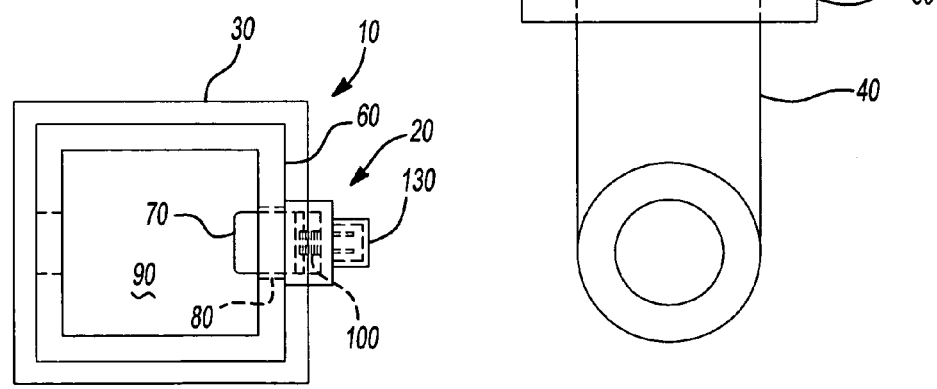
FIG. 2 illustrates a top view of FIG. 1 with a trailer hitch inserted into the trailer hitch receiver in accordance with the present invention.

In the following description, several well-known features of a trailer hitch receiver, including attachment to a vehicle, are not shown or described so as not to obscure the present invention. Referring now to the drawings, FIGS. 1-3 illustrate an exemplary embodiment of a deactivation arrangement 10 for a vehicle park assist system in accordance with the present invention.

The deactivation arrangement 10 includes a deactivation switch assembly 20 that is attached to a trailer hitch receiver 30. The trailer hitch receiver is attached to a vehicle (not shown) and is arranged to receive a trailer hitch 40. The trailer hitch 40 is arranged to be inserted into receiver 30 and secured in place by pin member 50.

Switch assembly 20 is affixed to an outer surface 60 of trailer hitch receiver 30 and includes a switch member 70 arranged to protrude through an opening 80 in receiver 30 and into an area 90 occupied by trailer hitch 40 when it is inserted into receiver 30. Switch member 70 is biased by a spring 100 to a non-depressed position 85 and arranged to protrude into area 90 in non-depressed position 85.

Switch assembly 20 is linked to a vehicle park assist system 110 through a wiring harness 120 attached to an electrical connector 130 of switch assembly 20. Vehicle park assist systems focused on collision avoidance are generally known to one of ordinary skill in the art and often include radar and/or ultrasonic sensors and emitters designed to alert a vehicle operator of an imminent collision when the operator is, for example, reversing the vehicle in a parking maneuver.

Switch assembly 20 is arranged to automatically deactivate and reactivate operation of vehicle park assist system 110 by depressing and releasing, respectively, switch member 70. More specifically, as best shown in FIG. 2, when trailer hitch 40 is inserted into trailer hitch receiver 30, hitch 40 will come into contact with and depress switch member 70 to a depressed position 75 overcoming the bias provided by spring 100. When switch member 70 is depressed to position 75, the vehicle park assist system is deactivated. Upon removing trailer hitch 40, spring 100 biases switch member 70 back to the non-depressed position 85 and thereby automatically reactivates the vehicle park assist system 110. Thus, vehicle park assist system 110 can remain activated unless switch member 70 is depressed to position 75, and if it is, the vehicle park assist system 110 will be automatically reactivated by removing trailer hitch 40 thereby automatically releasing switch member 70 back to non-depressed position 85.

In operation, the vehicle park assist deactivation arrangement of the present invention provides a simple and cost effective arrangement for automatically deactivating and reactivating the vehicle park assist system when a vehicle operator inserts a trailer hitch into a trailer hitch receiver. The arrangement of the present invention removes a need for a manually operated, instrument panel mounted switch that is not automatic and requires a vehicle operator to remember to turn on and off the vehicle park assist system.

In addition, the arrangement of the present invention solves the problem of needing to deactivate a vehicle park assist system automatically in preparation for attaching a trailer (i.e., when the trailer hitch is inserted into the receiver), but before the trailer is actually attached. Systems that require the trailer to be attached to the vehicle to disengage the park assist system are not beneficial in the above-mentioned scenario where the vehicle operator is reversing the vehicle to hook up the trailer. The present invention also provides a trailer detection and park assist deactivation feature since the trailer is attached to the vehicle via the trailer hitch and thus the park assist system will remain deactivated as long as the hitch is inserted in the receiver.

The foregoing description constitutes the embodiments devised by the inventors for practicing the invention. It is apparent, however, that the invention is susceptible to modification, variation, and change that will become obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. A deactivation arrangement for a vehicle park assist system, the deactivation arrangement comprising:
    a trailer hitch receiver affixed to the vehicle, the trailer hitch receiver arranged to receive a trailer hitch; and
    a switch assembly, the switch assembly operably connected with the vehicle park assist system and including a switch arranged to engage the trailer hitch when the trailer hitch is inserted into the trailer hitch receiver;
    wherein the switch assembly is arranged to deactivate the vehicle park assist system when the trailer hitch is inserted into the trailer hitch receiver and engages the switch.

2. The deactivation arrangement of claim 1, wherein upon removal of the trailer hitch from the trailer hitch receiver, the switch is arranged to disengage from the trailer hitch and thereby reactivate the vehicle park assist system.

3. The deactivation arrangement of claim 1, wherein the switch assembly is arranged to be affixed to the trailer hitch receiver.

4. The deactivation arrangement of claim 1, wherein the trailer hitch engages the switch by depressing the switch upon insertion of the trailer hitch into the trailer hitch receiver.

5. The deactivation arrangement of claim 1, wherein the switch assembly further comprises a biasing member, the biasing member arranged to bias the switch so as to maintain activation of the park assist system in the absence of a trailer hitch being inserted into the trailer hitch receiver and thereby overcoming the bias and depressing the switch.

6. The deactivation arrangement of claim 1, wherein the switch assembly further comprises a biasing member arranged to bias the switch to maintain activation of the park assist system, and wherein the trailer hitch is arranged to engage the switch and overcome the bias and thereby deactivate the park assist system upon inserting the trailer hitch into the trailer hitch receiver.

7. A vehicle, the vehicle comprising:
    a deactivation arrangement for a vehicle park assist system, the deactivation arrangement comprising:
    a trailer hitch receiver affixed to the vehicle, the trailer hitch receiver arranged to receive a mating trailer hitch; and
    a switch assembly, the switch assembly operably connected with the vehicle park assist system and including a switch arranged to engage the trailer hitch when the trailer hitch is inserted into the trailer hitch receiver;
    wherein the switch assembly is arranged to deactivate the park assist system upon insertion of the trailer hitch into the trailer hitch receiver and the trailer hitch engaging the switch.

8. The deactivation arrangement of claim 7, wherein upon removal of the trailer hitch from the trailer hitch receiver, the switch is arranged to disengage from the trailer hitch and thereby reactivate the park assist system.

9. The deactivation arrangement of claim 7, wherein the switch assembly is arranged to be affixed to the trailer hitch receiver.

10. The deactivation arrangement of claim 7, wherein the trailer hitch engages the switch by depressing the switch upon insertion of the trailer hitch into the trailer hitch receiver.

11. The deactivation arrangement of claim 7, wherein the switch assembly further comprises a biasing member, the biasing member arranged to bias the switch so as to maintain activation of the park assist system in the absence of a trailer hitch being inserted into the trailer hitch receiver and thereby overcoming the bias and depressing the switch.

12. The deactivation arrangement of claim 7, wherein the switch assembly further comprises a biasing member arranged to bias the switch to maintain activation of the park assist system, and wherein the trailer hitch is arranged to engage the switch and overcome the bias and thereby deactivate the park assist system upon inserting the trailer hitch into the trailer hitch receiver.

* * * * *